United States Patent [19]

Jenkins

[11] Patent Number: 4,789,540

[45] Date of Patent: Dec. 6, 1988

[54] CATALYTIC HYDROGEN GENERATOR FOR USE WITH METHANOL

[75] Inventor: John W. Jenkins, Chalkhouse Green, United Kingdom

[73] Assignee: Johnson Matthey Public Limited Co., London, England

[21] Appl. No.: 903,644

[22] Filed: Sep. 4, 1986

[30] Foreign Application Priority Data

Sep. 3, 1985 [GB] United Kingdom ................ 8521953

[51] Int. Cl.$^4$ ............................................. C01B 1/13
[52] U.S. Cl. .................... 423/648.1; 252/373; 422/111; 422/191; 423/437
[58] Field of Search ............... 423/415 A, 648 R, 437, 423/648.1; 252/373

[56] References Cited

U.S. PATENT DOCUMENTS

| | | | |
|---|---|---|---|
| 3,179,500 | 4/1965 | Bowen et al. | 252/373 |
| 3,469,944 | 9/1969 | Bocard et al. | 252/373 |
| 3,874,116 | 4/1975 | White | 252/373 |
| 3,928,460 | 12/1975 | Aicher et al. | 252/373 |
| 4,088,450 | 5/1978 | Kosaka et al. | 423/648 R |
| 4,091,086 | 5/1978 | Hindin et al. | 252/373 |
| 4,175,115 | 11/1979 | Ball et al. | 423/648 R |
| 4,501,823 | 2/1985 | Masuda | 252/373 |
| 4,676,972 | 6/1987 | Velenyi et al. | 502/304 |

FOREIGN PATENT DOCUMENTS

| | | | |
|---|---|---|---|
| 38682 | 10/1981 | European Pat. Off. | 252/373 |
| 1246688 | 8/1967 | Fed. Rep. of Germany | 252/373 |
| 2950251 | 6/1981 | Fed. Rep. of Germany | 252/373 |
| 1549201 | 12/1968 | France | 252/373 |
| 87045 | 5/1984 | Japan | 252/373 |
| 1144977 | 3/1985 | U.S.S.R. | 252/373 |

Primary Examiner—John Doll
Assistant Examiner—Wayne A. Langel
Attorney, Agent, or Firm—Cushman, Darby & Cushman

[57] ABSTRACT

A catalytic hydrogen generator which generates hydrogen by the partial oxidation of methanol by oxygen (usually supplied as air) which comprises a gas permeable catalyst system having an upstream zone (2) filled with a copper catalyst supported on a refractory support (3) (for example silica or silicate granules) and a downstream zone (4) filled with a mixture of a similar supported copper catalyst and a platinum or palladium catalyst supported on a similar refractory support (5b). A mixture of methanol and oxygen is fed to the upstream zone and initially permeates through to the downstream zone where spontaneous oxidation of the methanol is initiated raising the temperature of the system to a level at which partial oxidation of methanol in the presence of the copper catalyst in the upstream zone (2) commences and produces hydrogen.

6 Claims, 1 Drawing Sheet

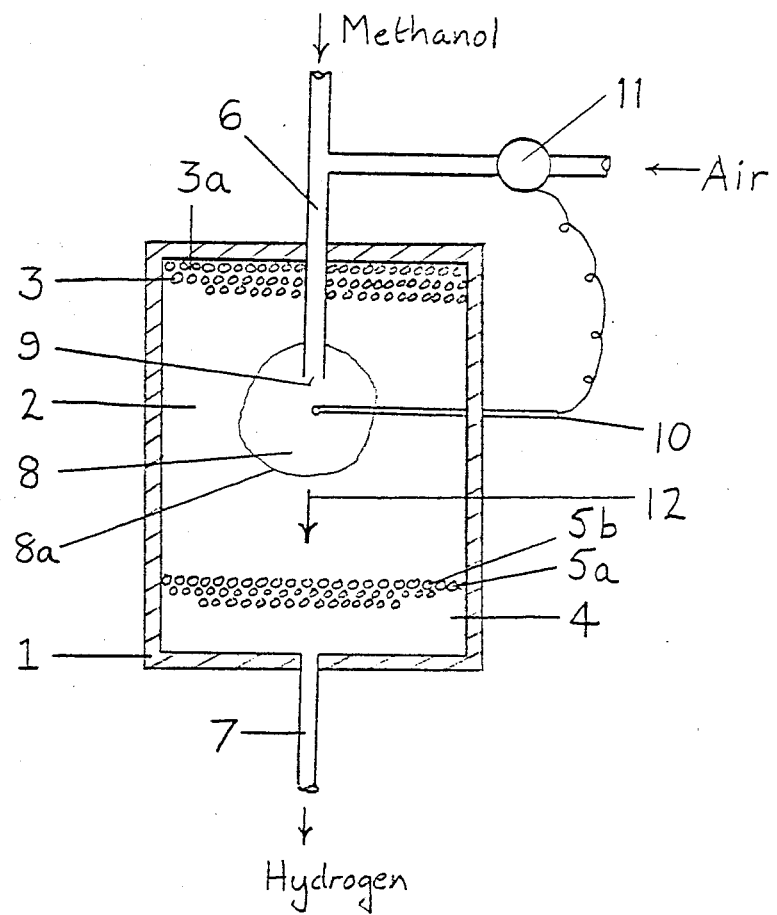

CATALYTIC HYDROGEN GENERATOR FOR USE WITH METHANOL

This invention relates to a catalytic hydrogen generator for use with methanol and oxygen (preferably supplied as air).

Existing catalytic hydrogen generators for use with methanol rely on the decomposition of methanol in the presence of water and copper chromite or zinc chromite in accordance with the following overall reaction:

$$CH_3OH + H_2O \rightarrow CO_2 + 3H_2$$

The reaction only proceeds satisfactorily when the reaction zone is heated to above 300° C. by externally generated heat which means that the reaction vessel must be provided with external heating means capable of generating large amounts of heat. The reaction is also performed at pressures of 20 to 30 bar which means that the reaction vessel must be pressure-resistant. In addition, existing generators produce significant quantities of carbon monoxide which is often an undesirable by-product. One of the objects of this invention is to minimise these disadvantages without causing complete oxidation of the methanol.

Accordingly this invention provides a catalytic hydrogen generator for use with mixtures of methanol and oxygen (preferably supplied as air) which generator contains a gas permeable catalyst system comprising (a) an upstream zone into which the methanol and oxygen can be fed and which contains a catalyst comprising copper moieties supported on a refractory support and (b) a downstream zone which can receive gases from the upstream zone and which contains a catalyst comprising copper moieties supported on a refractory support and mixed with a catalyst comprising moieties of one or more platinum group metals (hereinafter called "PG metals") chosen from platinum and palladium supported on a refractory support.

Preferably the refractory support comprises silica or a silicate especially when in the form of granules so that the mixture of copper and PG metal catalysts used in the downstream zone can be easily made by physically (for example tumble) mixing together granules supporting copper catalyst with granules supporting PG metal catalyst. Preferably the ratio of the volume of the support supporting the copper catalyst to the volume of the support supporting the PG metal catalyst is from 5 to 20:1.

The oxidation state of the copper and PG metal moieties is not known for certain and it probably varies during the generation of hydrogen. It has been found that when the mixture of methanol and oxygen is fed into the catalyst system at ambient temperature and pressure, the mixture initially permeates through the upstream zone without reacting and enters the downstream zone where the PG metal catalyst causes spontaneous oxidation of the methanol. The PG metal catalyst is not very selective towards the formation of hydrogen. However once the oxidation has started, the temperature in the downstream zone rises to that at which partial oxidation of methanol can be sustained in the upstream zone whereupon the front at which oxidation is occurring moves into the upstream zone and into the presence of the copper catalyst which is very selective to the production of hydrogen. It is believed that partial oxidation proceeds according to the following overall reaction scheme:

$$CH_3OH + \tfrac{1}{2}O_2 \xrightarrow{Cu} CO_2 + 2H_2$$

Yields of hydrogen as high as 80 to 90% of the theoretical maximum have been achieved which is a measure of the extent to which the catalyst system in the upstream zone is selective towards the production of hydrogen. Once started, this partial oxidation reaction generates enough heat to be self-sustaining and so no external heating means are needed. The partial oxidation reaction is also able to proceed at ambient pressure.

The catalyst system offers two further advantages. Firstly, soon after the oxidation of methanol has been initiated, the methanol oxidation reactions move away from the PG metal catalysts allowing the downstream zone to cool so minimising the losses of PG metal catalysts and the formation of carbon monoxide which would otherwise occur at high temperatures. Secondly, if any unreacted oxygen should arrive in the downstream zone, then it will be converted to water by the PG metal catalyst in the downstream zone so avoiding the possibility of dangerous amounts of oxygen being present in the hydrogen produced.

This invention also provides a process for the catalytic generation of hydrogen from a mixture of methanol and oxygen (preferably supplied as air) using a gas permeable catalyst system comprising:

(a) an upstream zone containing a catalyst comprising copper moieties supported on a refractory support and (b) a downstream zone containing a catalyst comprising copper moieites supported on a refractory support and mixed with a catalyst comprising moieties of one or more metals chosen from platinum and palladium supported on a refractory support wherein the mixture is fed into the upstream zone through which it permeates into the downstream zone where oxidation of methanol initiates spontaneously causing a rise in temperature to a temperature at which partial oxidation of methanol in the presence of a copper catalyst in the upstream zone can occur whereupon partial oxidation of methanol in the upstream zone commences and produces hydrogen. It is found that the partial oxidation reaction quickly establishes itself in a hot spot adjacent the place of entry of the mixture into the catalyst system. The precise size and location of this hot spot can be adjusted by varying the flow rate at which the mixture is fed into the system and it is preferred to adjust the flow rate so that the hot spot surrounds the place of entry of the mixture. The preferred flow rates are from 1 to 10 liters of gas mixture per hour per cm² of the cross-sectional area of the upstream zone in a plane transverse of the flow of the gases. Preferably the upstream and downstream zones are defined by a cylindrical reaction vessel having a length to diameter ratio of from 1 to 5:1.

The temperature within the hot spot can be increased or decreased respectively by increasing or decreasing respectively the amount of oxygen supplied to the mixture. Preferably the ratio of the volume (at 18° C. and 1 bar) of oxygen to the weight of methanol in the mixture is from 0.2 to 0.6:1 l/g. Preferably the catalyst system is provided with a combination of a thermocouple located within the hot spot and means responsive to the thermocouple for controlling the supply of oxygen to the mixture such that the combination can maintain the maximum temperature within the hot spot at or about a pre-determined level. The preferred maximum temperature lies in the range 300° to 600° C.

It is thought that the partial oxidation of methanol in the presence of a copper catalyst can occur at temperatures down to about 300° C. Accordingly the outer boundary of the hot spot is defined by the locus of points at which the temperature is 300° C. It appears that the presence of copper catalyst in a cooler zone downstream of the hot spot helps to minimise the production of carbon monoxide because at temperatures below 300° C., copper catalyses the carbon monoxide/steam shift reaction (i.e. $CO + H_2O \rightarrow CO_2 + H_2$) in a way which favours the production of carbon dioxide. Accordingly it is preferred that the volume of the hot spot should be no more than 50% of the volume of the upstream zone so as to ensure the presence of a cooler zone of adequate size.

The copper and PG metal moieties may be deposited on the refractory support by any conventional technique. The refractory support is preferably in the form of granules of diameter 1 to 5 mm so that the permeability of the catalyst system derives from the interstices between the granules.

It has been found that the tendency for carbon monoxide to be produced in temporary or localised incomplete partial oxidation reactions can be reduced by introducing steam into the mixture of methanol and oxygen preferably as soon as the hot spot has been established. Preferably the weight ratio of steam to methanol should be from 0.3 to 0.8 to 1.

The invention is further illustrated by the catalyst system described with reference to the drawing and by the following examples:

The drawing shows in section a catalyst system according to this invention.

The drawing shows a cylindrical reaction vessel 1 which houses a catalyst system composed of firstly an upstream zone 2 filled with granules 3 of a refractory support material which supports a copper catalyst and secondly a downstream zone 4 filled with a mixture of granules 5a and 5b of a refractory support material which in the case of granules 5a support a copper catalyst or in the case of granules 5b supports a PG metal catalyst. (For simplicity, only the top three layers of granules 3 or 5a and 5b are shown). Vessel 1 is provided with an inlet pipe 6 through which a mixture of methanol and air can be fed into upstream zone 2 and an outlet pipe 7 through which the gaseous products of the partial oxidation reaction can leave vessel 1.

When a mixture of methanol and air is fed into upstream zone 2, the mixture initially permeates through interstices 3a between granules 3 and enters downstream zone 4 where it contacts the PG metal catalyst and spontaneous oxidation of the methanol is initiated. The temperature rises to a temperature at which partial oxidation of methanol in the presence of a copper catalyst can occur whereupon partial oxidation commences in upstream zone 2 and quickly establishes itself within the boundary 8a of hot spot 8, which surrounds opening 9 of pipe 6 where the mixture enters the catalyst system.

Thermocouple 10 extends to the centre of hot spot 8 and is linked to a motorised valve 11 which controls the supply of air to pipe 6 and thence to hot spot 8. Valve 11 is responsive to thermocouple 10 in such a way that if the temperature at the centre of hot spot 8 exceeds a pre-determined value, valve 11 decreases the supply of air to hot spot 8 causing the temperature to fall. Alternatively if the temperature is too low, thermocouple 10 signals valve 11 to increase the supply of air.

Arrow 12 indicates the general direction of the flow of gases through upstream zone 2.

EXAMPLES 1 TO 5

A supported copper catalyst was made by wetting granules of silica with an aqueous solution of copper tetramine acetate and then washing and drying and heating the dried granules in air at 350° C. to remove amine and acetate moieties. The granules had an average diameter of about 2 mm and the supported catalyst produced contained 3 wt % of copper moieties based on the combined weight of the catalyst and support.

A supported palladium catalyst was made by wetting similar silica granules with an aqueous solution of palladium tetramine chloride and then washing, drying and heating the dried granules in air at 350° C. to remove amine and chloride moieties. The supported catalyst produced contained 5 wt % of palladium moieties based on the combined weight of the catalyst and support.

Some of the granules supporting the copper catalyst were loaded into the upstream zone of a reaction vessel of the type shown in the drawing to produce the upstream zone of a catalyst sytem. The rest of the granules supporting the copper catalyst were tumble mixed with the granules supporting the palladium catalyst so as to produce a mixture in which the ratio of the volume of copper-supporting granules to the volume of palladium-supporting granules was 9:1. The mixture was then loaded into the downstream zone of a catalyst system. The vessel was cylindrical and was approximately 100 mm long and 40 mm in diameter. The lengths of the upstream and downstream zones were 80 mm and 20 mm respectively.

A mixture of methanol and air was fed into the upstream zone of the catalyst system. The mixture consisted of methanol fed at a rate of 10 g/hour and air fed at one of various rates as specified in Table 1. The mixture permeated through the upstream zone into the downstream zone where it contacted the palladium catalyst and oxidation of the methanol initiated spontaneously. Within about 5 minutes of starting up, the temperature had risen to over 300° C. and partial oxidation of methanol to produce hydrogen and carbon dioxide had commenced in the upstream zone. Within a further 10 minutes, the partial oxidation reaction was established within the boundary of an approximately spherical hot spot about 20 mm in diameter. The hot spot surrounded the point of entry of the mixture into the catalyst system. The maximum temperature in the hot spot, the proportions of methanol oxidised and the yields of hydrogen obtained at various feed rates for air are shown in Table 1. It will be seen that the yields of hydrogen are highest when the maximum temperature in the hot spot is above 300° C. and in the range 450° to 500° C.

TABLE 1

| Example | Air Feed Rate l/hour | Ratio of Air to methanol l/g | Maximum Temperature °C. of Hot Spot | % Conversion of Methanol | Yield of Hydrogen l/hour at 18° C. and 1 bar | Yield as % of theoretical maximum |
| --- | --- | --- | --- | --- | --- | --- |
| 1 | 10 | 1 | 310 | 39 | 4.7 | 33 |
| 2 | 15 | 1.5 | 300 | 77 | 10.3 | 72 |
| 3 | 17.5 | 1.75 | 400 | 95 | 11.9 | 83 |
| 4 | 20 | 2 | 460 | 99 | 12.2 | 85 |
| 5 | 25 | 2.5 | 600 | 100 | 10.9 | 76 |

EXAMPLES 6 TO 10

The procedure of Examples 1 to 5 was repeated except that as soon as the hot spot had been established, 6 g/hour of steam were injected into the mixture of methanol and air which was being fed to the upstream zone. It was found that the presence of the steam almost eliminated carbon monoxide production. The results obtained are shown in Table 2.

TABLE 2

| Example | Air Feed Rate liters/hour | *Volume of carbon monoxide produced l/hour Steam Added | *Volume of carbon monoxide produce l/hour Steam Omitted |
| --- | --- | --- | --- |
| 6 | 10 | 0 | 0 |
| 7 | 15 | 0 | 0.2 |
| 8 | 17.5 | 0 | 1.1 |
| 9 | 20 | 0 | 1.3 |
| 10 | 22.5 | 0.25 | ** |

*Measured at 18° C. and 1 bar
**1.16 l/hour of carbon monoxide was obtained when the air feed rate was 25 l/hour.

I claim:

1. A process for the catalytic generation of hydrogen from a mixture of methanol and oxygen which does not require the application of external heat using a gas permeable catalyst system comprising
   (a) an upstream zone (2) comprising a catalyst consisting essentially of copper moieties supported on a refractory support (3) and
   (b) a downstream zone (4) containing a catalyst comprising copper moieties supported on a refractory support (5a) and mixed with a catalyst comprising moieties of one or more metals chosen from platinum and palladium supported on a refractory support (5b)
   wherein the mixture is fed into the upstream zone through which it permeates into the downstream zone where oxidation of methanol initiates spontaneously causing a rise in temperature to a temperature at which partial oxidation of methanol in the presence of a copper catalyst in the upstream zone can occur whereupon partial oxidation of methanol in the upstream zone commences and produces hydrogen.

2. A process according to claim 1 wherein steam is fed into the upstream zone (2) in addition to the mixture of methanol and oxygen.

3. A process according to claim 1 wherein the rate at which the mixture of methanol and oxygen is fed into the upstream zone (2) is adjusted so that partial oxidation of the methanol occurs in a hot spot (8) having a boundary (8a) defined by the locus of points having a temperature of 300° C. and which hot spot surrounds (8) the place (9) where the mixture enters the upstream zone (2).

4. A process according to claim 1 wherein the ratio of the volume (at 18° C. and 1 bar) of oxygen to the weight of methanol in the mixture is from 0.2 to 0.6:1 l/g.

5. A process according to claim 3 wherein the rate at which the mixture of methanol and oxygen is fed into the upstream zone (2) and/or the ratio of oxygen to methanol in the mixture is adjusted to ensure that the volume of the hot spot (8) is no greater than 50% of the volume of the upstream zone (2).

6. A process according to claim 1 wherein the maximum temperature in the catalyst system is from 300° to 600° C.

* * * * *